Figure 1:
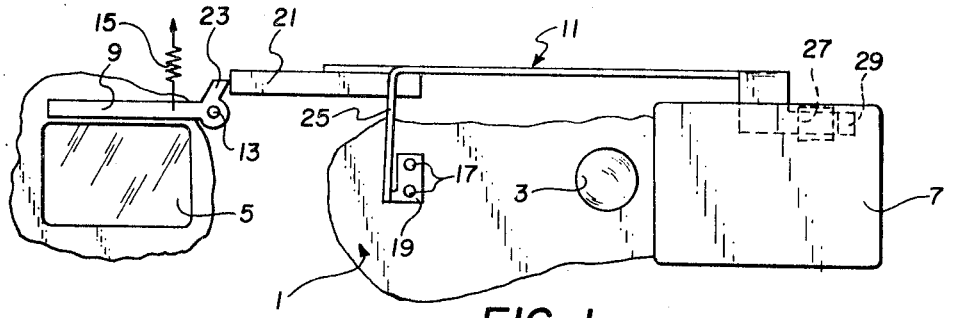
Figure 2:
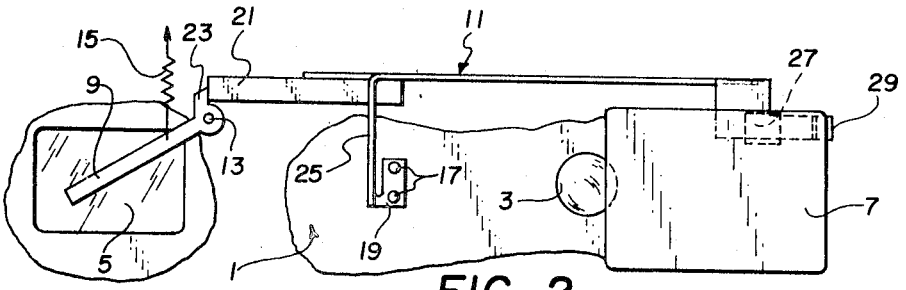
Figure 3:
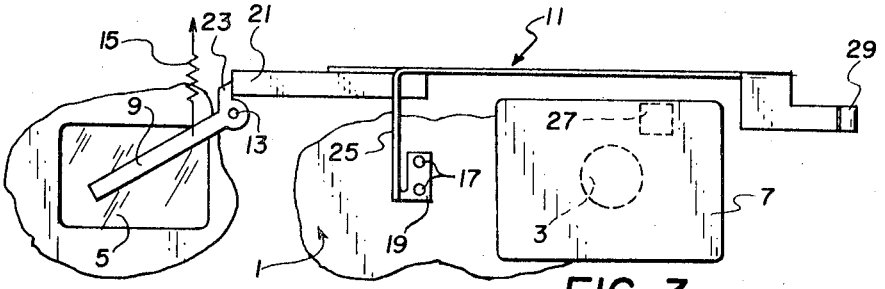
Figure 4:
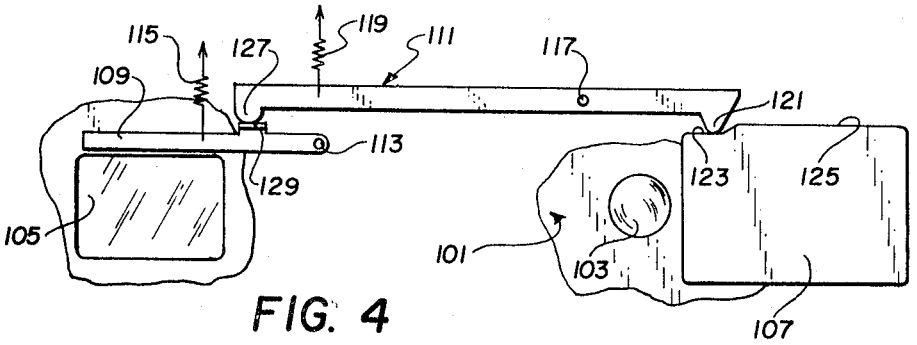
Figure 5:
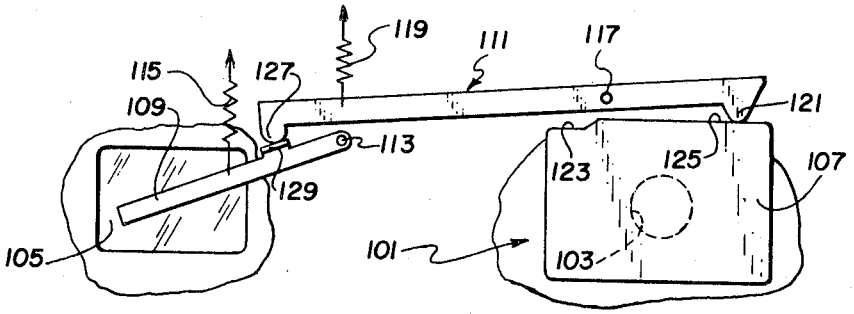
Figure 6:
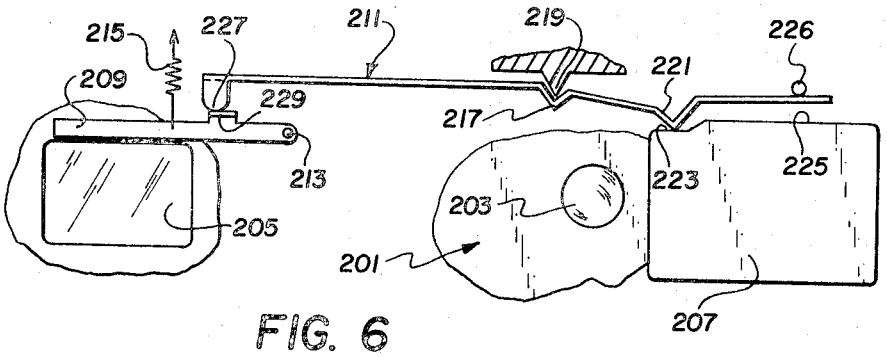
Figure 7:
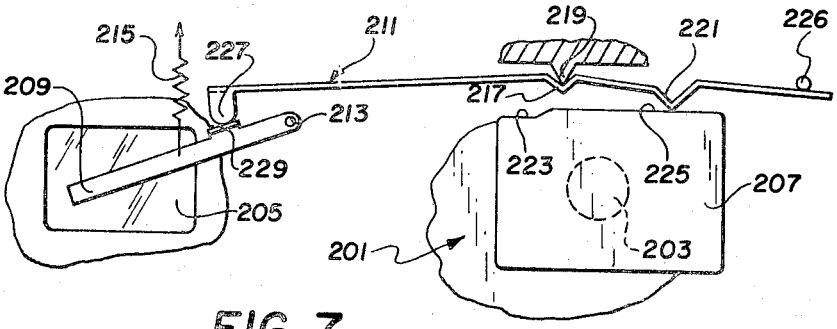
Figure 8:
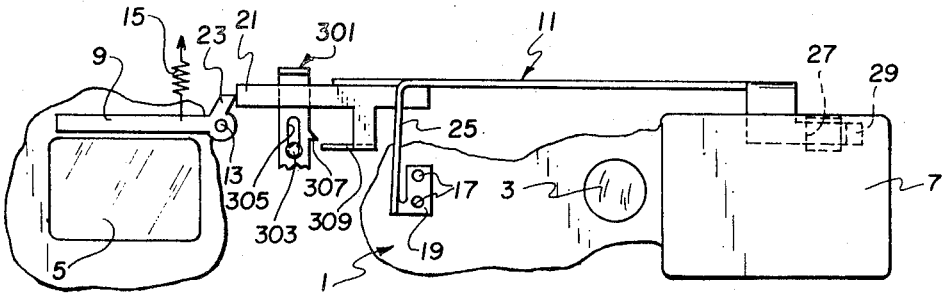
Figure 9:
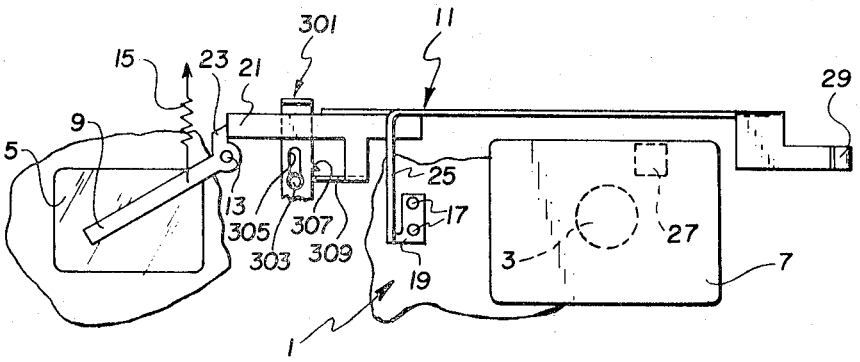

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 7, 1972

896 O.G. 19

T896,020
LENS COVER AND SIGNAL DEVICE
David E. Beach, 901 Elmgrove Road,
Rochester, N.Y. 14650
Filed Feb. 9, 1971, Ser. No. 113,874
Int. Cl. G03b *17/20*
U.S. Cl. 95—11 V
3 Sheets Drawing. 17 Pages Specification

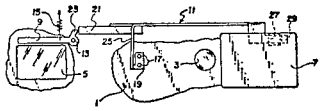

A camera having a picture taking lens and a view-finder includes a cover 7 for protecting the lens, and a signal device 9 which becomes visible in the viewfinder whenever the cover blocks the lens.

March 7, 1972 D. E. BEACH T896,020

LENS COVER AND SIGNAL DEVICE

Filed Feb. 9, 1971 3 Sheets-Sheet 1

DAVID E. BEACH
INVENTOR.

D. Peter Hochberg

BY

W. H. J. Kline

ATTORNEYS

LENS COVER AND SIGNAL DEVICE

Filed Feb. 9, 1971 3 Sheets-Sheet 2

DAVID E. BEACH
INVENTOR.
BY D. Peter Hochberg
W. H. J. Kline
ATTORNEYS

LENS COVER AND SIGNAL DEVICE

Filed Feb. 9, 1971 3 Sheets-Sheet 3

DAVID E. BEACH
INVENTOR.
BY D. Peter Hochberg
W. H. J. Kline
ATTORNEYS